(12) United States Patent
Li et al.

(10) Patent No.: US 9,201,521 B2
(45) Date of Patent: Dec. 1, 2015

(54) STORING TRACE INFORMATION

(71) Applicant: QUALCOMM Incorporated, San Diego, CA (US)

(72) Inventors: Ren Li, San Diego, CA (US); Hui-ya L. Nelson, San Diego, CA (US); Samir K. Gupta, San Diego, CA (US); Noam Dagan, Haifa (IL); Darrell L. Krulce, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 130 days.

(21) Appl. No.: 13/913,078

(22) Filed: Jun. 7, 2013

(65) Prior Publication Data
US 2013/0328810 A1 Dec. 12, 2013

Related U.S. Application Data

(60) Provisional application No. 61/657,618, filed on Jun. 8, 2012.

(51) Int. Cl.
| G06F 3/045 | (2006.01) |
| G06F 3/0354 | (2013.01) |
| G06F 3/043 | (2006.01) |
| G06F 3/0488 | (2013.01) |

(52) U.S. Cl.
CPC ............ G06F 3/03545 (2013.01); G06F 3/043 (2013.01); G06F 3/04883 (2013.01)

(58) Field of Classification Search
CPC . G06F 3/03545; G06F 3/043; G06F 3/04883; G06F 3/0418; G06F 3/044; G06F 3/046; G06F 2203/04106
USPC .................................................. 345/156–178
See application file for complete search history.

(56) References Cited

U.S. PATENT DOCUMENTS

| 8,018,440 | B2 | 9/2011 | Townsend et al. | |
| 8,400,422 | B2 | 3/2013 | Chang et al. | |
| 8,400,425 | B2 | 3/2013 | Chang et al. | |
| 2006/0012580 | A1 | 1/2006 | Perski et al. | |
| 2009/0207154 | A1 | 8/2009 | Chino | |
| 2011/0084934 | A1* | 4/2011 | Tsuzaki et al. | 345/174 |
| 2012/0158629 | A1 | 6/2012 | Hinckley et al. | |
| 2012/0182238 | A1 | 7/2012 | Lee | |
| 2012/0262407 | A1 | 10/2012 | Hinckley et al. | |
| 2013/0100074 | A1* | 4/2013 | Chang et al. | 345/174 |
| 2013/0229390 | A1* | 9/2013 | DiVerdi | 345/179 |
| 2014/0168142 | A1* | 6/2014 | Sasselli et al. | 345/174 |
| 2014/0191983 | A1* | 7/2014 | Choi et al. | 345/173 |
| 2014/0306909 | A1* | 10/2014 | Pedersen et al. | 345/173 |
| 2014/0362046 | A1* | 12/2014 | Yoshida | 345/174 |

FOREIGN PATENT DOCUMENTS

WO   2013063241 A1   5/2013

OTHER PUBLICATIONS

International Search Report and Written Opinion—PCT/US2013/044853—ISA/EPO—Aug. 23, 2013.

* cited by examiner

*Primary Examiner* — Kent Chang
*Assistant Examiner* — Nelson Rosario
(74) *Attorney, Agent, or Firm* — Muncy, Geissler, Olds & Lowe, P.C.

(57) ABSTRACT

The disclosure is directed to storing trace information. An aspect includes determining whether or not a pen is within a threshold distance of the touchscreen, storing trace information generated by a user's touch in a touch buffer if the pen is not within the threshold distance of the touchscreen, and clearing the touch buffer and storing trace information generated by the pen in the touch buffer if the pen is within the threshold distance of the touchscreen.

38 Claims, 11 Drawing Sheets

STORING TRACE INFORMATION

CLAIM OF PRIORITY UNDER 35 U.S.C. §119

The present application for patent claims priority to Provisional Application No. 61/657,618, entitled "PALM REJECTION," filed Jun. 8, 2012, and assigned to the assignee hereof and hereby expressly incorporated by reference in its entirety herein.

FIELD OF THE DISCLOSURE

The disclosure relates to touchscreen input methods, and more particularly to rejecting unintentional inputs from a user's palm.

BACKGROUND

There are two categories of stylus pens, passive pens, such as capacitive pens, and active pens, such as ultrasound pens and electromagnetic resonance (EMR) pens. There are various situations that require palm rejection (i.e., distinguishing between a palm touch and a pen or finger touch) while a user is using a stylus pen. For example, ultrasound pens can be used to write both on screen and off screen. For on screen usage, a user's palm often rests on the touchscreen while writing. Such a palm touch should be rejected/ignored, but the high level operating system (HLOS) may not be able to distinguish between the palm touch and a finger touch. As another example, while writing, the user may lift the pen up momentarily and use a finger for gesture control, such as a pan or zoom, and then start writing again. In these scenarios, it would be beneficial for the touchscreen to show the pen input without any palm induced traces. It would also be beneficial for the user to be able to use a finger to perform touch controls on screen when not writing.

Current solutions are not sufficient to meet these requirements. One solution disables finger touch detection when the pen is within two to three inches of the touchscreen. In normal usage, however, the user's palm can be resting on the device even with the pen two or three inches above the device. Further, the accuracy of determining the stylus pen to be within a certain zone above the touchscreen is dependent on the technology. For example, accurate ultrasound pen proximity detection may be more challenging than that of an EMR-type stylus pen that has a more uniform inductive grid under the touchscreen.

Further, the touchscreen should remain active for gestures. Various current solutions use complex algorithms to distinguish traces generated by a finger while ignoring palm touch traces. The results, however, can be inconsistent depending on the size, orientation, or relative movement of the user's palm.

Accordingly, current solutions fail to perform palm rejection effectively in at least the following scenarios: (1) the user wishes to start writing on the touchscreen, but before the pen is hovering over or touches the touchscreen, the user's palm/wrist is already resting on the touchscreen, causing palm induced traces on the touchscreen; (2) the user pauses writing for a moment and uses a finger touch gesture to zoom the content, but the pen is not lifted high enough to get out of the sensing zone, so the gesture input is ignored; (3) like (2), except that the pen is still touching the touchscreen, but not moving.

SUMMARY

Embodiments of the disclosure are directed to storing trace information. A method for storing trace information includes determining whether or not a pen is within a threshold distance of a touchscreen, storing trace information generated by a user's touch in a touch buffer if the pen is not within the threshold distance of the touchscreen, and clearing the touch buffer and storing trace information generated by the pen in the touch buffer if the pen is within the threshold distance of the touchscreen.

An apparatus for storing trace information includes logic configured to determine whether or not a pen is within a threshold distance of a touchscreen, logic configured to store trace information generated by a user's touch in a touch buffer if the pen is not within the threshold distance of the touchscreen, and logic configured to clear the touch buffer and store trace information generated by the pen in the touch buffer if the pen is within the threshold distance of the touchscreen.

An apparatus for storing trace information includes means for determining whether or not a pen is within a threshold distance of a touchscreen, means for storing trace information generated by a user's touch in a touch buffer if the pen is not within the threshold distance of the touchscreen, and means for clearing the touch buffer and storing trace information generated by the pen in the touch buffer if the pen is within the threshold distance of the touchscreen.

A non-transitory computer-readable medium for storing trace information includes at least one instruction to determine whether or not a pen is within a threshold distance of a touchscreen, at least one instruction to store trace information generated by a user's touch in a touch buffer if the pen is not within the threshold distance of the touchscreen, and at least one instruction to clear the touch buffer and store trace information generated by the pen in the touch buffer if the pen is within the threshold distance of the touchscreen.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
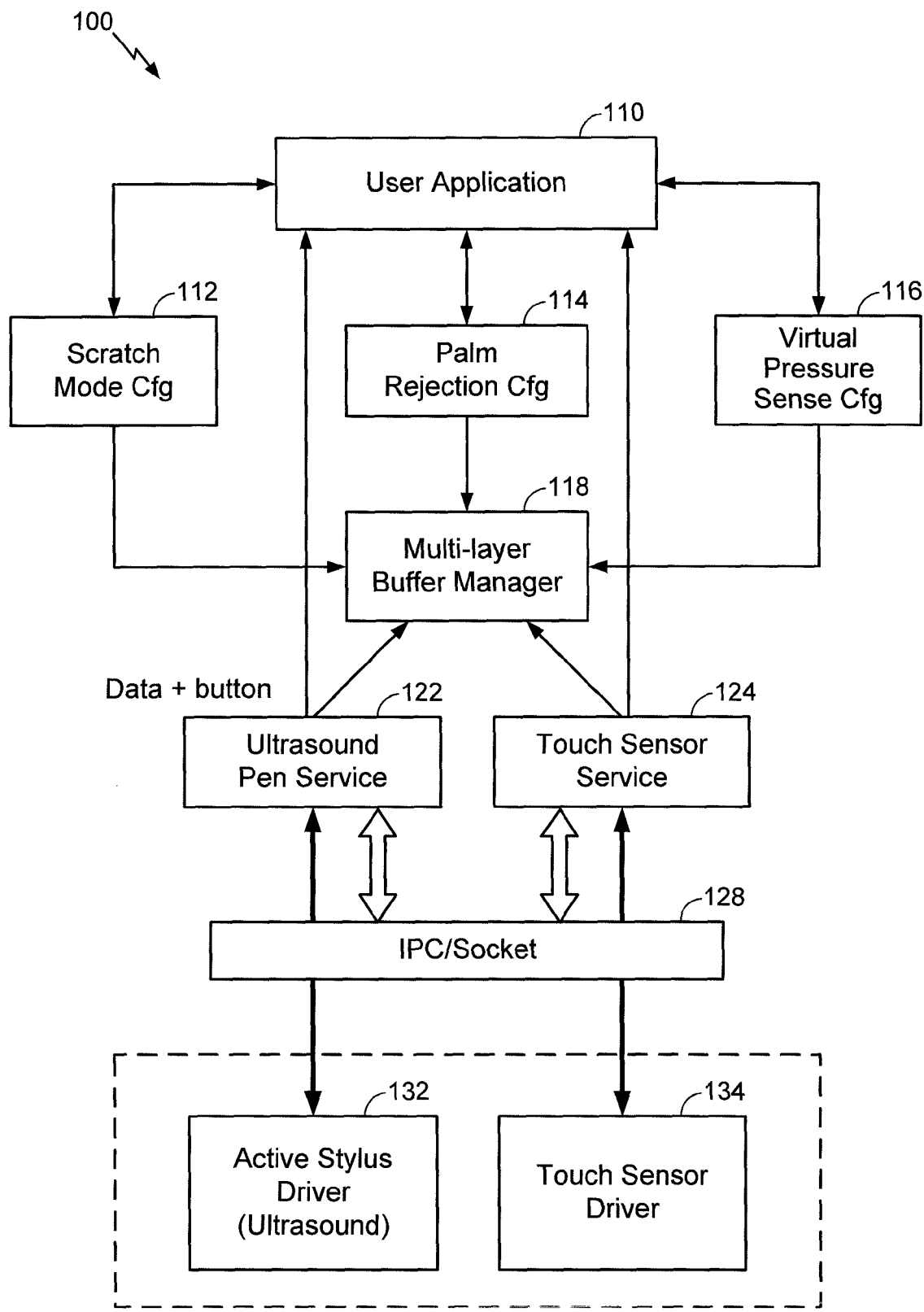
FIG. 1 illustrates an exemplary architecture according to at least one aspect of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may connect to the Internet over a local wireless network, such as a WiFi network (e.g., based on IEEE 802.11, etc.). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. UEs can be embodied by any of a number of types of devices including but not limited to PC cards, compact flash devices, external or internal modems, wireless or wireline phones, and so on.

Various aspects of the disclosure are directed to various features for devices configured to accept touch input from, for example, a stylus pen, a user's finger, a user's palm, and/or the like. A palm rejection aspect rejects palm touches while allowing finger touch gesture control for digital stylus pen applications by using a selective buffering scheme. A multi-layer buffering scheme provides a multi-layer scratch paper mode to enhance the pen application. A virtual pressure sense-enabled pen mode uses a three dimensional pen hovering function that allows the pen application to change the trace color and/or line width depending on the virtual pen pressure information to mimic the behavior of a real ink pen.

FIG. 1 illustrates an exemplary architecture 100 according to at least one aspect of the disclosure. The architecture 100 of FIG. 1 can be embodied in any UE that has a touchscreen. A user application 110 includes a scratch mode configuration 112, a palm rejection configuration 114, and a virtual pressure sense configuration 116. These configurations may be one or more software modules, one or more hardware modules, or a combination of software and hardware. The scratch mode configuration 112, palm rejection configuration 114, and virtual pressure sense configuration 116 are each coupled to and send data to a multi-layer buffer manager 118. The multi-layer buffer manager 118 is coupled to a touch buffer, such as buffer 906 in FIG. 9, and the multi-layer buffer manager 118 and the touch buffer are referred to interchangeably herein. The multi-layer buffer manager 118 is coupled to and receives data from an ultrasound pen service 122 and a touch sensor service 124. The data from the ultrasound pen service 122 may include touch data and button data. The user application 110 is also coupled to and receives data from the ultrasound pen service 122 and the touch sensor service 124. The ultrasound pen service 122 is coupled to and sends and receives data to/from an inter-process communication (IPC) socket 128 and an active stylus driver 132 (for an ultrasound pen). The touch sensor service 124 is coupled to and sends and receives data to/from the IPC socket 128 and a touch sensor driver 134.

While the foregoing illustration describes the various elements in terms of applications, it will be appreciated that the various elements may be embodied in hardware. For example, the buffer may implemented as specific hardware such as memory coupled one or more processors and/or with embedded logic to perform the functionality disclosed herein. Additionally, as previously noted the various elements/functions described herein can implemented by specific circuits, by program instructions being executed by one or more processors, or by a combinations of hardware and software to perform the functionality described herein.

The disclosed palm rejection for touchscreen devices, such as tablets, personal digital assistants, smartphones, etc., works for any active type pen drivers that can distinguish pen and finger touch input, such as an ultrasound pen, by using different device identifiers for pen input and touch gestures. This palm rejection may be used with any active type pens or pen drivers other than those that are explicitly recited herein.

A pen application can save and buffer the trace history generated by user touches (finger or palm) and erase them whenever a pen-down event (e.g., when the pen touches the touchscreen or is within a threshold distance of the touchscreen) is sensed. The pen application may still respond to any multi-touch events, such as for a zoom, while the pen is up. Any palm-induced traces on the touchscreen may be erased when the user starts writing again. This functionality may be achieved through selectively buffering the pen and touch trace history. Finger touches can be preserved along with the pen trace by introducing a finger/palm detection algorithm. By implementing the detection algorithm in the kernel touch driver in some aspects, operating system user interface (UI) widgets can also be immune from palm touches.

FIG. 1 illustrates an exemplary architecture 100 for implementing this aspect of the disclosure. For example, the palm rejection configuration 114 may be configured to implement the functionality particular to this aspect.

Figure 2:
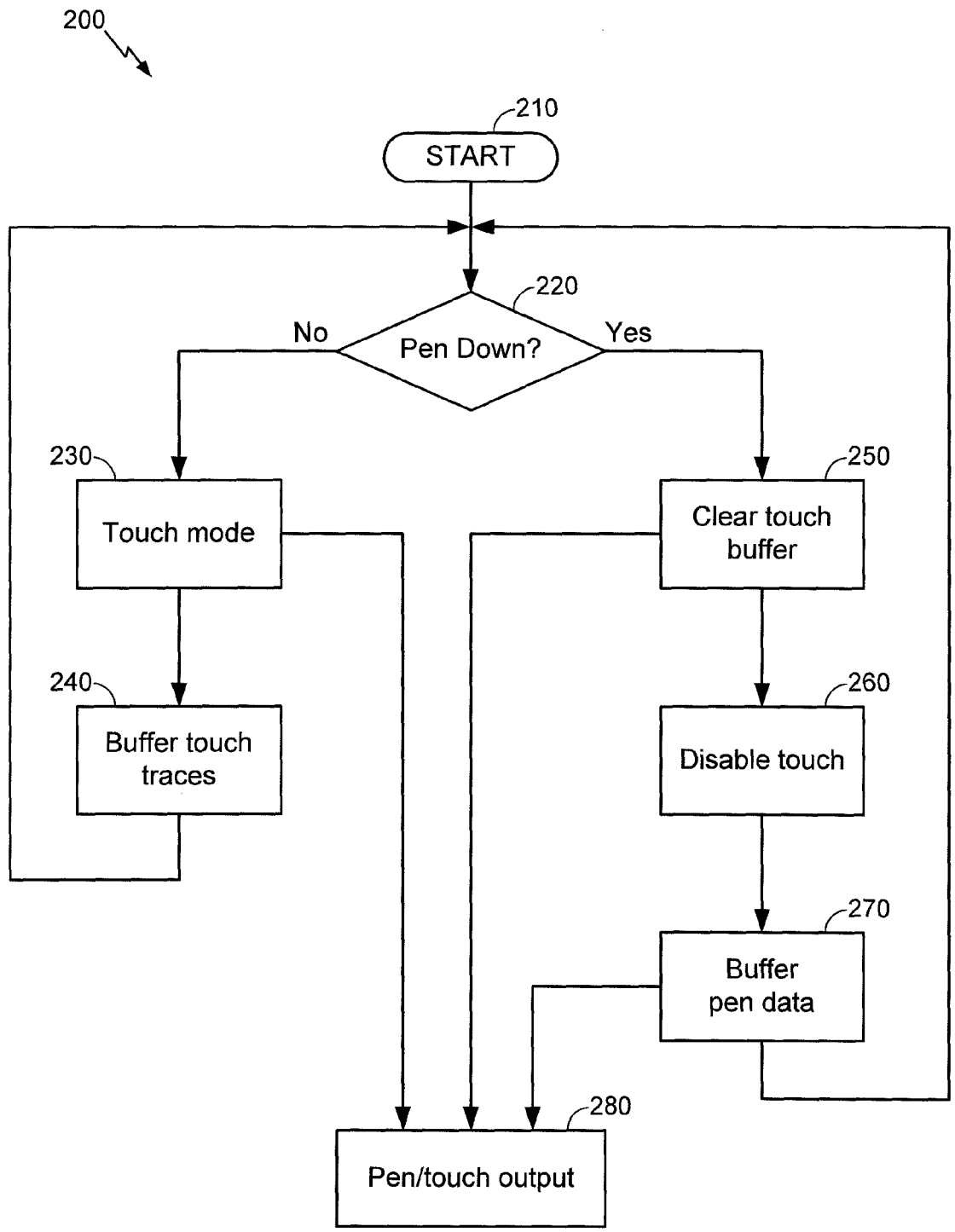
FIG. 2 illustrates an exemplary flow for erasing all touch traces except for the pen trace.

FIG. 2 illustrates an exemplary flow 200 for erasing all touch traces except for the pen trace. The flow 200 may be performed by the architecture 100 illustrated in FIG. 1. At 210, the flow starts. At 220, the architecture 100, for example the palm rejection configuration 114 in combination with the ultrasound pen service 122, determines whether or not the pen is down, that is, whether or not the user is writing. The architecture 100 may determine that the pen is "down" if it is touching the touchscreen or if it is within a threshold distance of the touchscreen. The architecture 100, for example the ultrasound pen service 122 and the active stylus driver 132, can determine whether or not the pen is touching the touchscreen or is within the threshold distance from the touchscreen based on ultrasound, projective capacitance, capacitive touch, a pressure sensor in the pen tip, etc. The threshold distance can vary according to the various aspects described herein. For example, the threshold distance may be zero, meaning that the pen must be touching the touchscreen to be "down."

If the pen is not down, that is, the user is not writing, then at 230, a pen application, such as the user application 110 illustrated in FIG. 1, is in the touch mode and, at 280, any touches or gestures received are processed accordingly. At 240, the architecture 100, for example the palm rejection configuration 114 in combination with the multi-layer buffer manager 118 and the touch sensor service 124, buffers the touch traces made by the user, then returns to 220.

If, however, the pen is down at 220, then at 250, the architecture 100, for example the palm rejection configuration 114 in combination with the multi-layer buffer manager 118 and the ultrasound pen service 122, clears the touch buffer and, at 280, processes any pen information received. At 260, the architecture 100, for example the palm rejection configuration 114 in combination with the touch sensor service 124, disables the touch sensing. At 270, the architecture 100, for example the palm rejection configuration 114 in combination with the multi-layer buffer manager 118 and the user application 110, buffers any received pen data and, at 280, outputs the buffered pen data. The flow then returns to 220.

Figure 3:
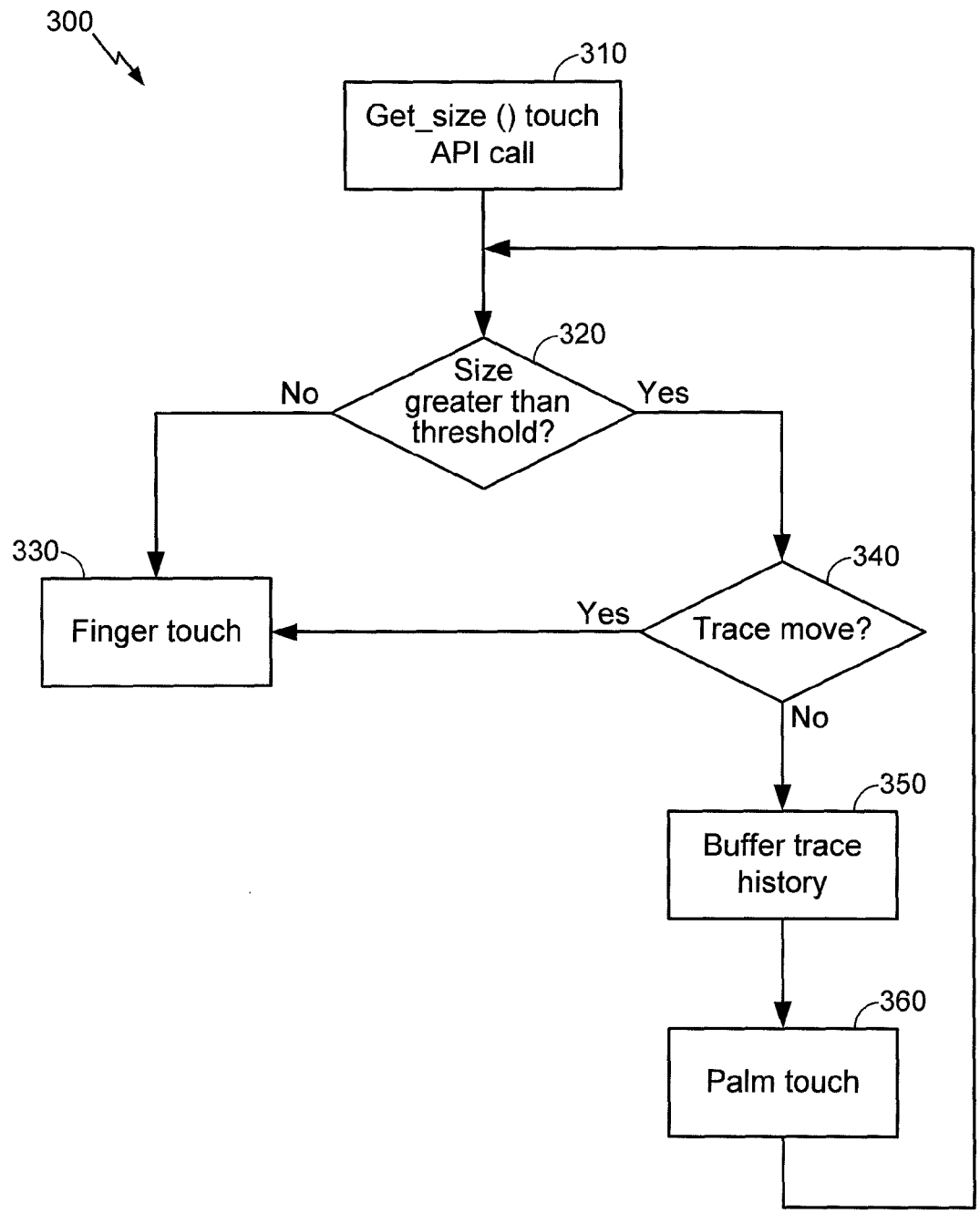
FIG. 3 illustrates an exemplary flow for distinguishing finger and palm traces.

FIG. 3 illustrates an exemplary flow 300 for distinguishing finger and palm traces. The flow 300 may be performed by the architecture 100 illustrated in FIG. 1. For example, the palm rejection configuration 114 may be configured to implement the functionality particular to this aspect.

At 310, the architecture 100, for example the palm rejection configuration 114, calls the touch application programming interface (API) with the function Get_size( ) which returns the size of the touch. The size of the touch may be determined by identifying a cluster of multiple points in a given area of the touchscreen. Those of skill in the art will appreciate that other methods of determining the size of the touch may be used.

At 320, the architecture 100, for example the palm rejection configuration 114, determines if the returned size is greater than a threshold. If it is not, then at 330, the touch is determined to be a finger touch and is processed accordingly. If, however, at 320, the size is greater than the threshold, then at 340, the architecture 100, for example the palm rejection configuration 114, determines whether or not the touch is moving, and therefore generating a trace history. If it is, then at 330, the touch is determined to be a finger touch and is processed accordingly. If the touch is not moving, however, then at 350, the trace history is buffered, and at 360, the touch is determined to be a palm touch. The flow then returns to 310.

A palm touch may also be distinguished from a finger touch by idea ng a contour of the cluster of multiple points and determining that the user's touch is a palm touch based on the shape of the contour. Additionally, a palm touch may be distinguished from a finger touch based on a cluster of points that move together, the profile of the contour, a determination of where the user's palm is expected to be based on whether the user is right or left handed, etc.

Figure 4:
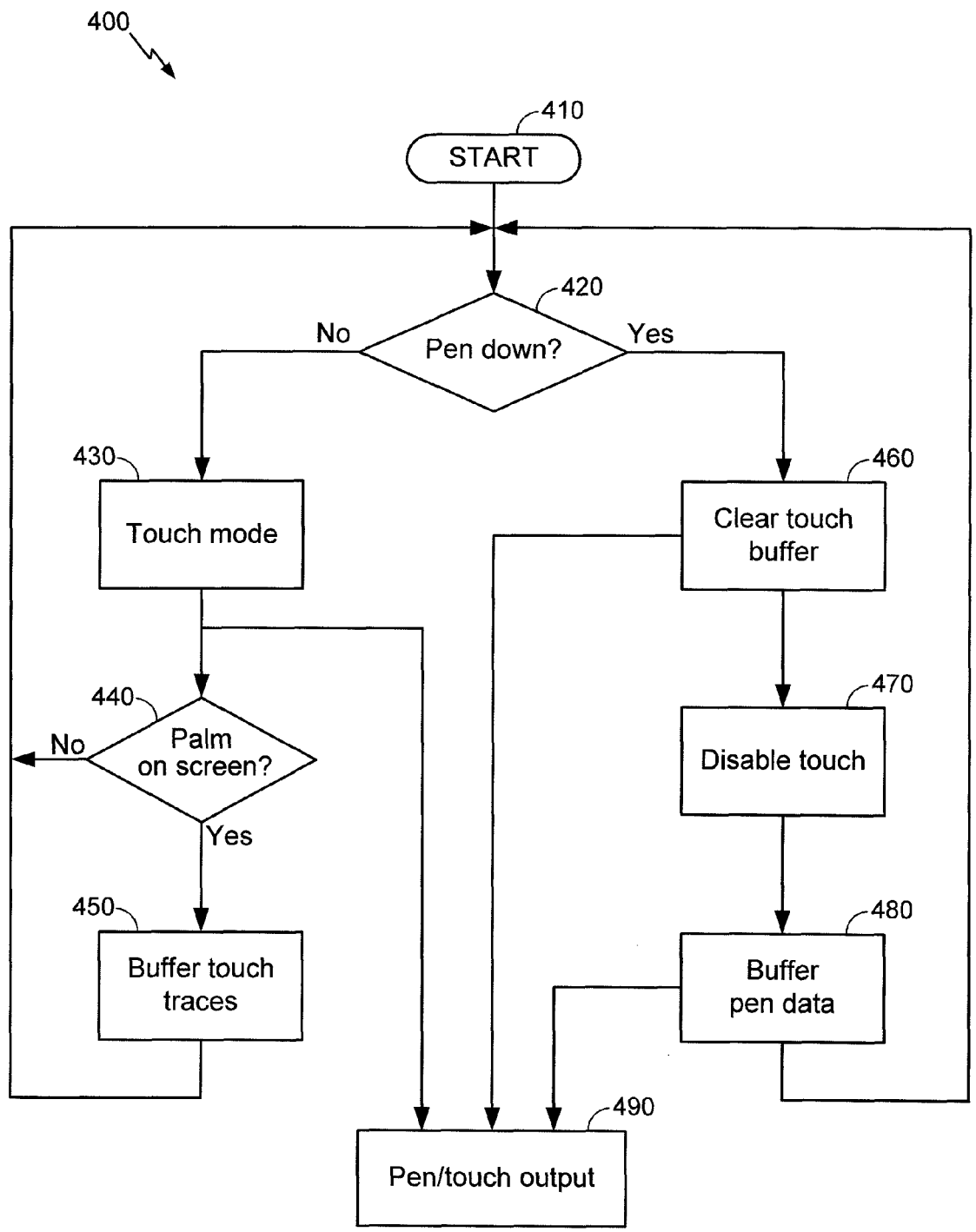
FIG. 4 illustrates an exemplary flow that integrates the flow of FIG. 2 and the flow of FIG. 3.

There are situations that require keeping the finger touch traces as well as the pen traces. FIG. 4 illustrates an exemplary flow 400 that integrates flow 200 of FIG. 2 and flow 300 of FIG. 3. In FIG. 4, when the presence of the user's palm is detected, both finger and palm traces are buffered and will be cleared when the pen tip is removed from the touchscreen. The flow 400 may be performed by the architecture 100 illustrated in FIG. 1, for example, the palm rejection configuration 114.

Flow 400 starts at 410. At 420, the architecture 100, for example the palm rejection configuration 114 in combination with the ultrasound pen service 122, determines whether or not the pen is down, as in 220 of FIG. 2. If it is not down, that is, the user is not writing, then at 430, the architecture 100 is in touch mode. At 440, the architecture 100, for example the palm rejection configuration 114 in combination with the touch sensor service 124, determines whether or not the user's palm is on the touchscreen, as described with respect to FIG. 3. If it is, then at 450, the architecture 100, for example the palm rejection configuration 114 in combination with the multi-layer buffer manager 118, buffers the touch traces made by the user, then returns to 420. If it is not, then the flow simply returns to 420. Either way, at 490, any touches or gestures received are processed accordingly.

If, at 420, it is determined that the pen is down, then at 460, the architecture 100, for example the palm rejection configuration 114 in combination with the multi-layer buffer manager 118 and the ultrasound pen service 122, clears the touch buffer and, at 490, processes any pen information received. At 470, the architecture 100, for example the palm rejection configuration 114 in combination with the touch sensor service 124, disables the touch sensing. At 480, the architecture 100, for example the palm rejection configuration 114 in combination with the multi-layer buffer manager 118 and the ultrasound pen service 122, buffers any received pen data, and at 490, outputs the buffered pen data. The flow then returns to 420.

Flow 400 can be modified to determine whether or not a confidence level associated with the touch being a palm or finger touch is high enough to distinguish the finger and palm induced traces. In that case, only the palm trace is buffered. The buffered palm traces will be cleared next time the pen tip is down while preserving the finger traces while the palm is present.

An aspect of the disclosure provides a multi-layer scratch paper mode for a touchscreen device. Students often use scratch paper and an ink pen to do their homework. In an aspect, digital scratch pages and the "real," or original, page can be seen on the same touchscreen via an overlay in a scratch pen mode. The scratch pen mode can be entered either by using a button on the stylus pen or from a menu selection within the application. After entering this mode, the original content on the original page, such as text and/or graphics, can change color and/or fade into the background, but is still visible. The touchscreen can then be used for scratch operations, such as for equation calculations. Any subsequent pen or finger traces are saved in multi-layer buffers. For example, given two equations on the same original page, the user could save traces for the first calculation in one of the multi-layer buffers and the traces for the other calculation in another of the multi-layer buffers.

After getting the proper result on the scratch paper, i.e., the scratch mode overlay layer, the user can switch back to the non-scratch mode and transfer the result from the scratch page(s)/layer(s) to the original page. The user can then select either to keep the current scratch pages/layers or erase them.

Through this multi-layer buffering scheme, the user can save up to a predefined number of scratch pages for later reference.

FIG. 1 illustrates an exemplary architecture 100 for implementing this aspect of the disclosure. For example, the scratch mode configuration 112 may be configured to implement the functionality particular to this aspect.

Figure 5:
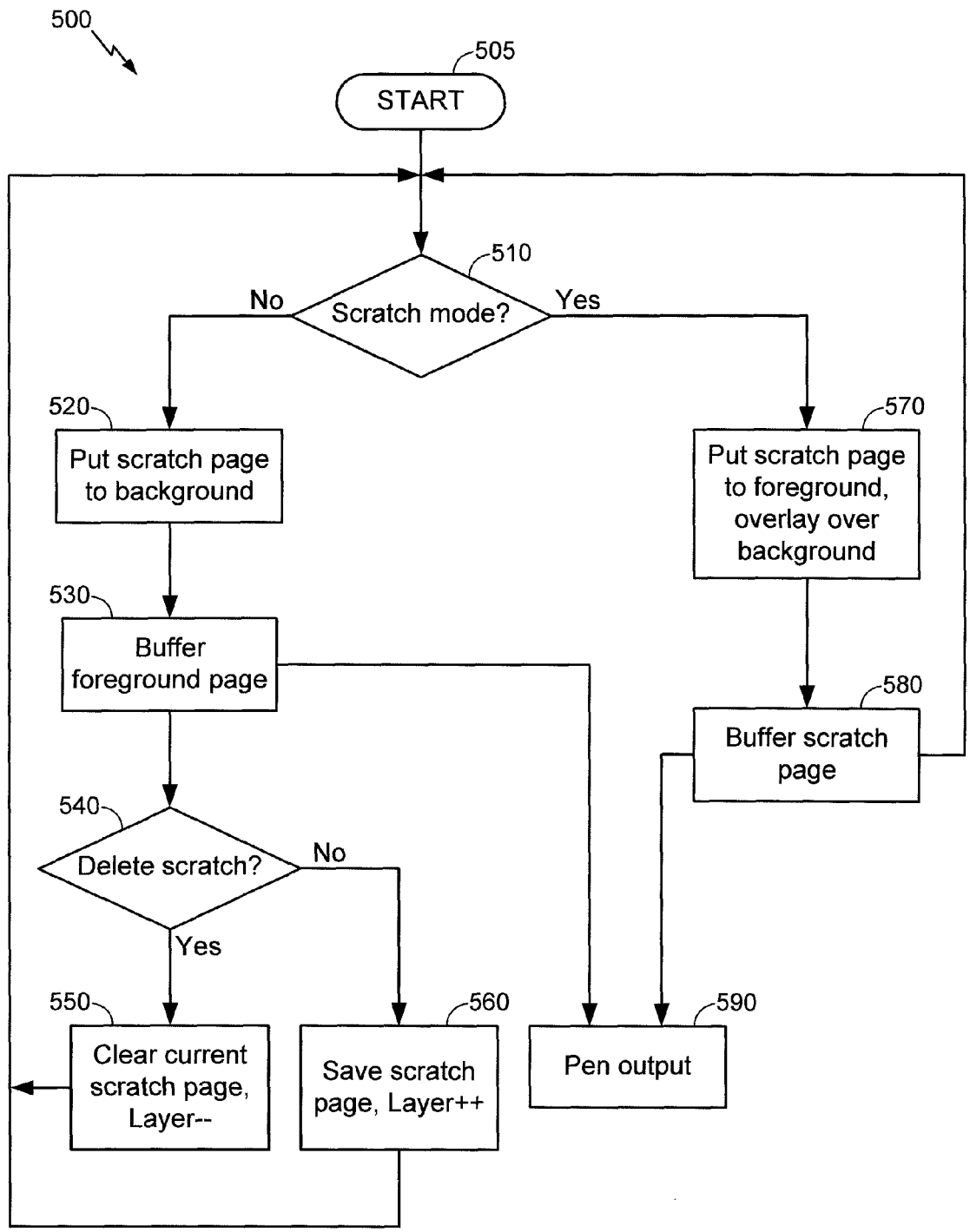
FIG. 5 illustrates an exemplary flow of a scratch mode operation.

FIG. 5 illustrates an exemplary flow 500 of a scratch mode operation. The flow 500 may be performed by the architecture 100 illustrated in FIG. 1, for example the scratch mode configuration 112 in combination with other elements of the architecture 100. Flow 500 starts at 505. At 510, the architecture 100, for example the scratch mode configuration 112, determines whether or not it has entered the scratch mode. As discussed above, this may be based on the user pressing a button on the stylus pen or a menu selection within the user application 110.

If the user application 110 is in the scratch mode, then at 570, the architecture 100, for example the scratch mode configuration 112 in combination with the multi-layer buffer manager 118, loads a scratch page/layer to the foreground and overlays it on the original page and any previously loaded scratch pages/layers. The previously added scratch pages/layers may be grayed-out similar to the original page, as discussed above. At 580, the architecture 100, for example the scratch mode configuration 112 in combination with the multi-layer buffer manager 118 and the ultrasound pen service 122, buffers the scratch page/layer and any traces made thereon, outputs any pen information received at 590, and returns to 510.

If, at 510, the architecture 100, for example the scratch mode configuration 112, determines that the application is not in the scratch mode, or leaves the scratch mode, then at 520, the architecture 100, for example the scratch mode configuration 112 in combination with the multi-layer buffer manager 118, moves the scratch page/layer to the background and, at 530, buffers the original page and brings it to the foreground. At 590, the architecture 100, for example the scratch mode configuration 112 in combination with the ultrasound pen service 122, outputs any received pen information, such as any pen traces.

At 540, the architecture 100, for example the scratch mode configuration 112, determines whether or not it should delete the scratch page/layer. This may be based on user input, lack of storage space, expiration of a timer, or any other appropriate criteria. If the scratch page/layer should be deleted, then at 550, the architecture 100, for example the scratch mode configuration 112 in combination with the multi-layer buffer manager 118, clears the current scratch page/layer and decrements a counter representing the number of scratch pages/layers. If, however, the scratch page/layer should not be deleted, then at 560, architecture 100, for example the scratch mode configuration 112 in combination with the multi-layer buffer manager 118, saves the scratch page/layer and increments the counter representing the number of scratch pages/layers. The flow 500 then returns to 510.

An aspect of the disclosure provides a virtual pressure sensor for a stylus pen. To mimic the behavior of a real ink pen, pressure information can be used to change the trace color and/or line width. Current touch APIs have pressure and size properties that can be used by the pen application and they do not require the pen to send any pressure information to the touchscreen device. These properties are not accurate enough, however, to realize useful pressure sensing functionality, since capacitive touchscreens, the most common type, are more sensitive to size than to pressure, and the pressure result varies as a function of the touch orientation, size, etc. Further, touchscreens from different vendors will produce different output.

Figure 6:
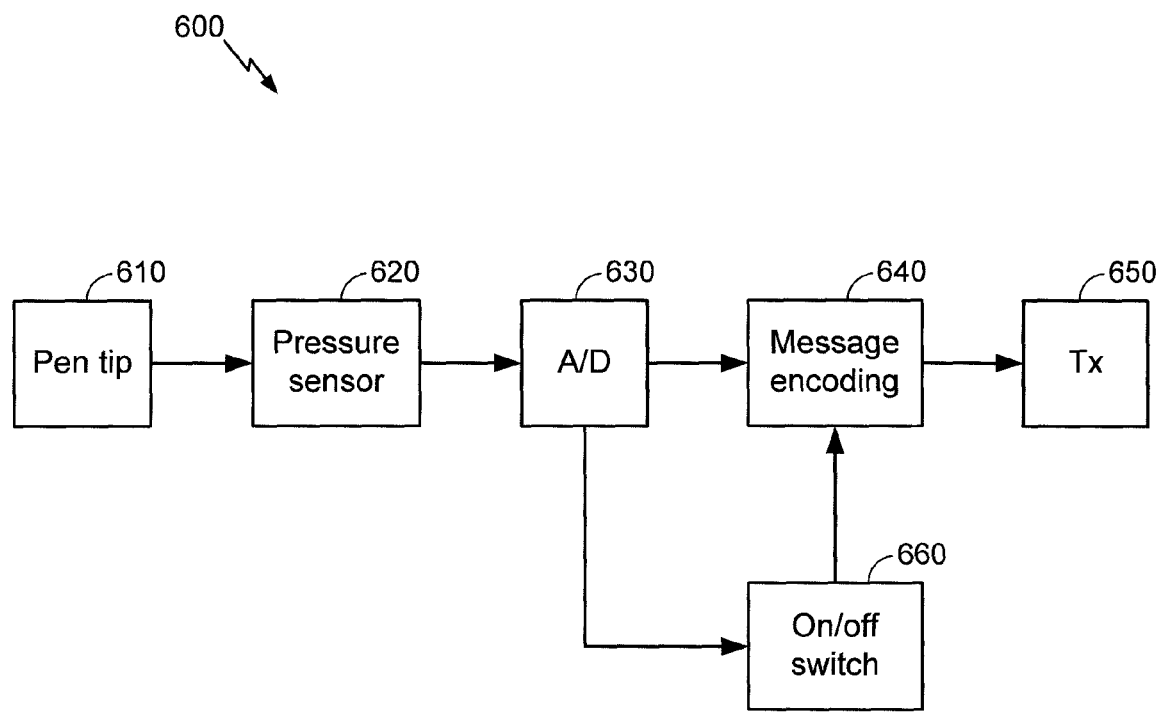
FIG. 6 illustrates an exemplary structure of a pressure sensor equipped ultrasound pen.

To increase the accuracy of the pressure sensing functionality, a stylus pen can send pressure information directly to the touchscreen device. This requires a pressure sensor to be installed in the pen. The structure of a pressure sensor equipped ultrasound pen 600 is illustrated in FIG. 6. Ultrasound pen 600 includes a pen tip 610 that sends data to a pressure sensor 620. The pressure sensor 620 sends data to an analog/digital (A/D) converter 630, which sends data to a message encoder 640 and an on/off switch 660. The on/off switch state can be derived from the pressure sensor data rather than using a hardware switch. The message encoder 640 receives data from the on/off switch 660 and sends data to a transmitter 650.

Challenges for a hardware pressure sensor approach include the needs to design small form factor pressure sensors that can achieve high pressure resolution. Hardware pressure sensors also increase the cost, design complexity, and calibration difficulty of the pen.

The virtual pressure sensor mode of the disclosure does not require a hardware pressure sensor. For an ultrasound pen, three dimensional (3D) coordinates (x, y, z) are available and the resolution of the Z-axis is high enough to substitute for real pressure information. To enter this mode, a user could, for example, hold a button on the pen while tracing. The button can disable the normal pen power-save mode that normally starts after a pen tip up timeout. In this mode, pen traces above the touchscreen can change the line width as a function of the height (Z distance) of the tip relative to the touchscreen. The virtual pressure mode can also change the pen to a brush mode with different brush widths based on the pen tilt information. An ultrasound pen may track this tilt information. The larger the tilt angle, the wider the brush, similar to the behavior of a real ink pen/brush. Another alternative is to give the pen tip more room to move up and down depending on the pen tip pressure. This allows the virtual pressure mode to also work for screen writing with the pen tip down.

FIG. 1 illustrates an exemplary architecture 100 for implementing this aspect of the disclosure. For example, the virtual pressure sense configuration 116 may be configured to implement the functionality particular to this aspect.

Figure 7:
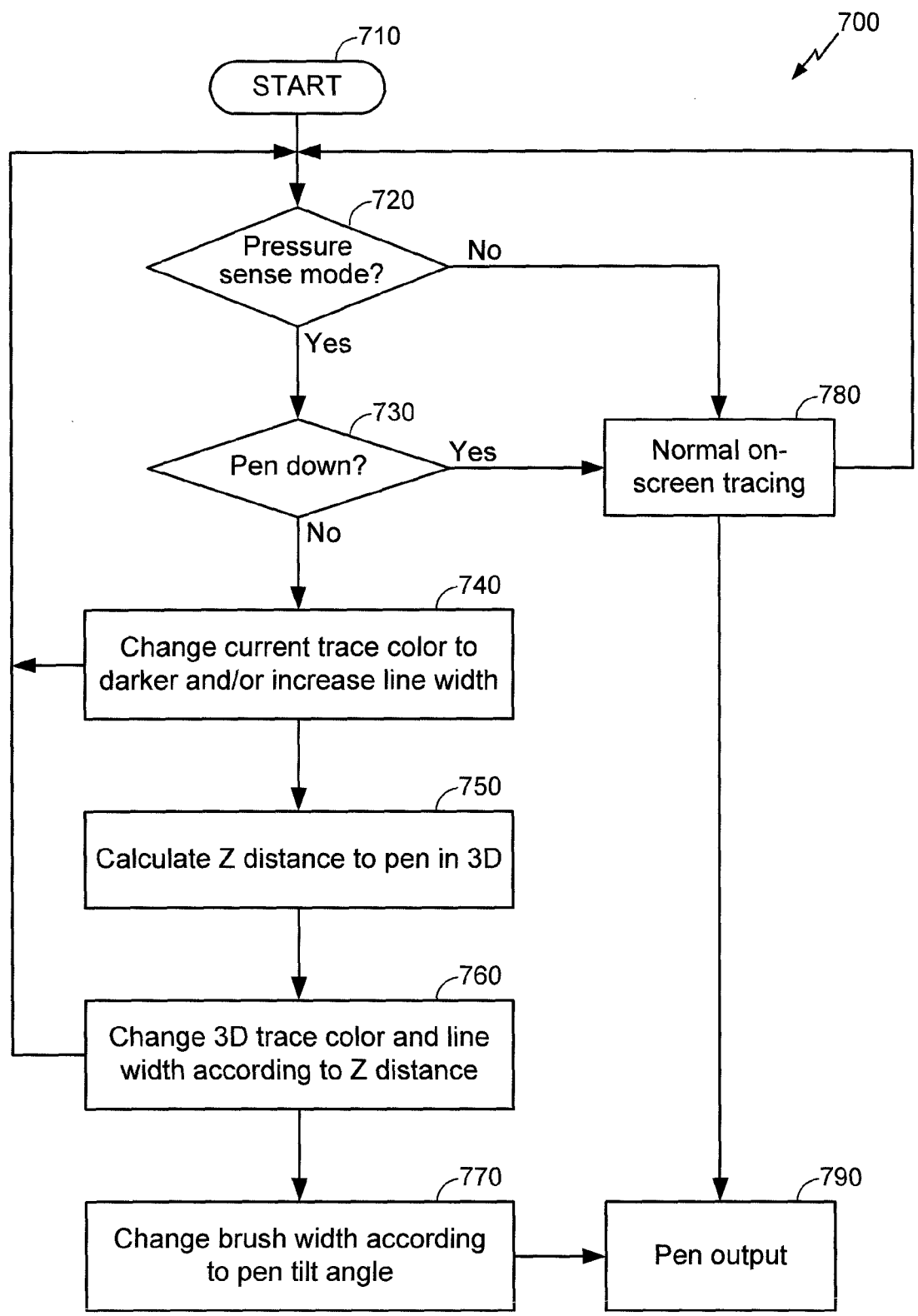
FIG. 7 illustrates an exemplary flow for providing a virtual pressure sense mode.

FIG. 7 illustrates an exemplary flow 700 for providing a virtual pressure sense mode. Flow 700 starts at 710. At 720, the architecture 100, for example the virtual pressure sense configuration 116, determines whether or not it is in the pressure sense mode. If it is not, then at 780, it operates as in the normal on-screen tracing mode, for example, according to the flow of FIG. 4, and outputs any received pen information at 790. If, however, the architecture 100, for example the virtual pressure sense configuration 116, determines that it is in the pressure sense mode, then at 730, it determines whether or not the pen is tip-down on the touchscreen, as in 220 of FIG. 2. In this aspect, if the pen is touching the touchscreen, that is, if the threshold distance is zero, then at 780, the architecture 100 operates as in the normal on-screen tracing mode, for example, according to 460-480 of the flow of FIG. 4, and outputs any received pen information at 790.

If however, the architecture 100, for example the virtual pressure sense configuration 116 in combination with the ultrasound pen service 122, determines at 730 that the pen is not contacting the touchscreen, then at 740, the architecture 100, for example the virtual pressure sense configuration 116 in combination with the ultrasound pen service 122, changes the current trace color to a darker color and/or increases the line width. Flow 700 returns to 720 to determine whether or not the application leaves the pressure sense mode and also proceeds to 750. At 750, the architecture 100, for example the virtual pressure sense configuration 116 in combination with the ultrasound pen service 122, calculates the Z distance from the pen to the touchscreen. The Z distance may be constrained by a maximum threshold (which may be same or different than the threshold distance discussed above, for example with respect to FIG. 2), or limited only by the accuracy/range of the ultrasound pen. At 760, the architecture 100, for example the virtual pressure sense configuration 116 in combination with the ultrasound pen service 122, changes the trace color and/or line width according to the Z distance, returns to 720 to determine whether or not the application leaves the pressure sense mode, and also proceeds to 770. At 770, if enabled, the architecture 100, for example the virtual pressure sense configuration 116 in combination with the ultrasound pen service 122, changes the brush width according to the pen tilt angle. At 790, the architecture 100, for example the virtual pressure sense configuration 116 in combination with the ultrasound pen service 122, outputs the pen information, including the trace color, line width, and/or brush width.

In virtual pressure sense mode illustrated in FIG. 7, the touch buffer may be cleared and the pen trace buffered, as in 460 and 480 of FIG. 4, if the pen is not touching the screen (i.e., the no branch of 730). This is because, although the pen is not physically touching the screen, the user is still using it to write on the screen. In embodiments where the threshold distance discussed above, for example with respect to FIG. 2, is greater than zero, the touch buffer may be clear and the pen trace buffered only when the pen is within the threshold distance. In some embodiments, a first threshold distance may be used when the pressure sense mode is engaged, and a second (different) threshold distance used when the pressure sense mode is not engaged. For example, the user may wish to clear the touch buffer at a further distance in the pressure sense mode because the user may be likely to provide input using the pen at a greater distance in the pressure sense mode. In some embodiments, there may be no threshold distance or the threshold distance may be functionally infinite while in the pressure sense mode or set thereto when the pressure sense mode is engaged, for example, such that the touch buffer is cleared and the pen trace buffered regardless of how far the pen is from the touchscreen.

Figure 8:
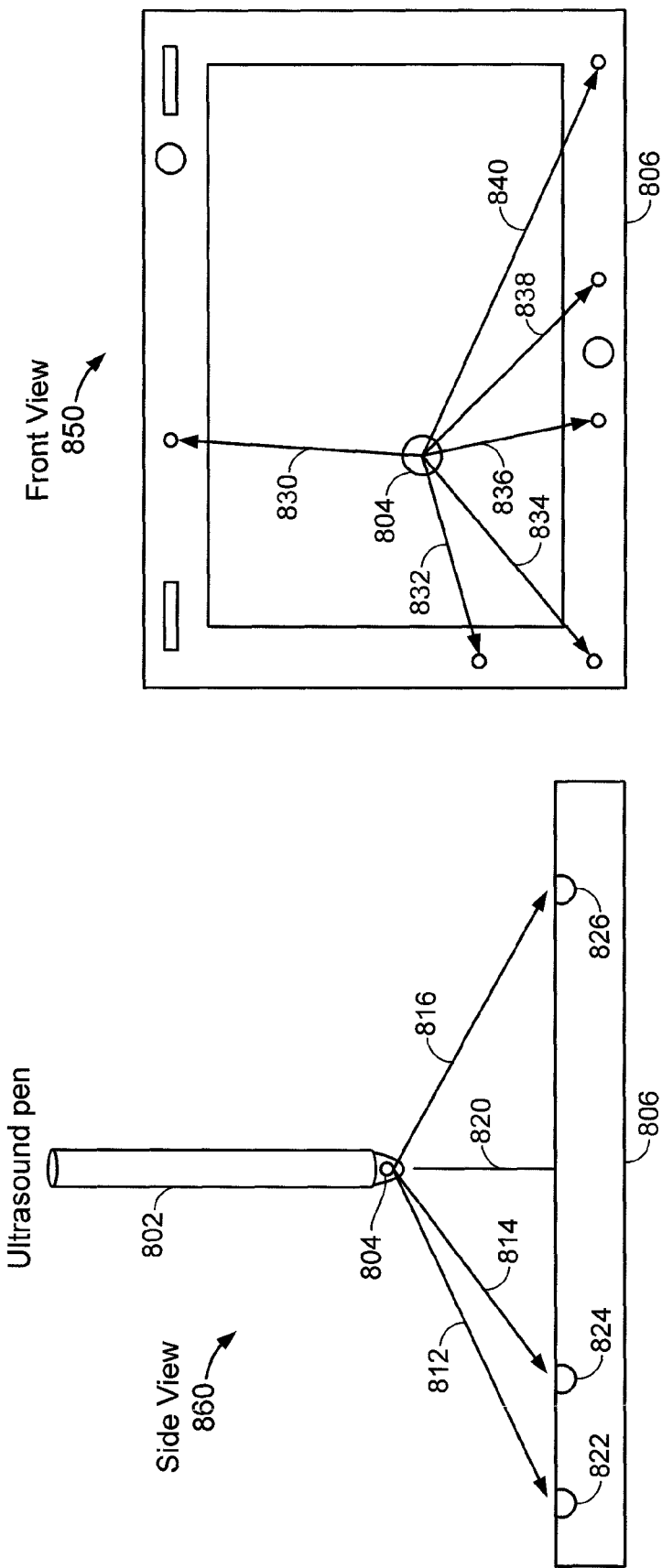
FIG. 8 illustrates an exemplary ultrasound stylus pen and touchscreen device that can perform the flow of FIG. 7.

FIG. 8 illustrates an exemplary ultrasound stylus pen 802 and touchscreen device 806 that can perform the flow 700 of FIG. 7. A front view 850 shows a top view of one or more ultrasound emitters 804 and the touchscreen device 806. The ultrasound emitter(s) 804 emit ultrasonic waves 830, 832, 834, 836, 838, and 840 that are received by various microphones to determine the ultrasound emitter(s) 804's position over the touchscreen device 806 in the x-y-z plane. A side view 860 shows the ultrasound pen 802 above the touchscreen device 806. The ultrasound emitter(s) 804 emit ultrasonic waves 812, 814, and 816 that are received by microphones 822, 824, and 826 to determine vertical distance, or Z distance, 820, in addition to the x, y position. The user can increase or decrease vertical distance 820 to increase or decrease the line width and/or change the trace color. To calculate the tilt of the pen 802, at least two ultrasound emitters 804 can be used.

Figure 9:
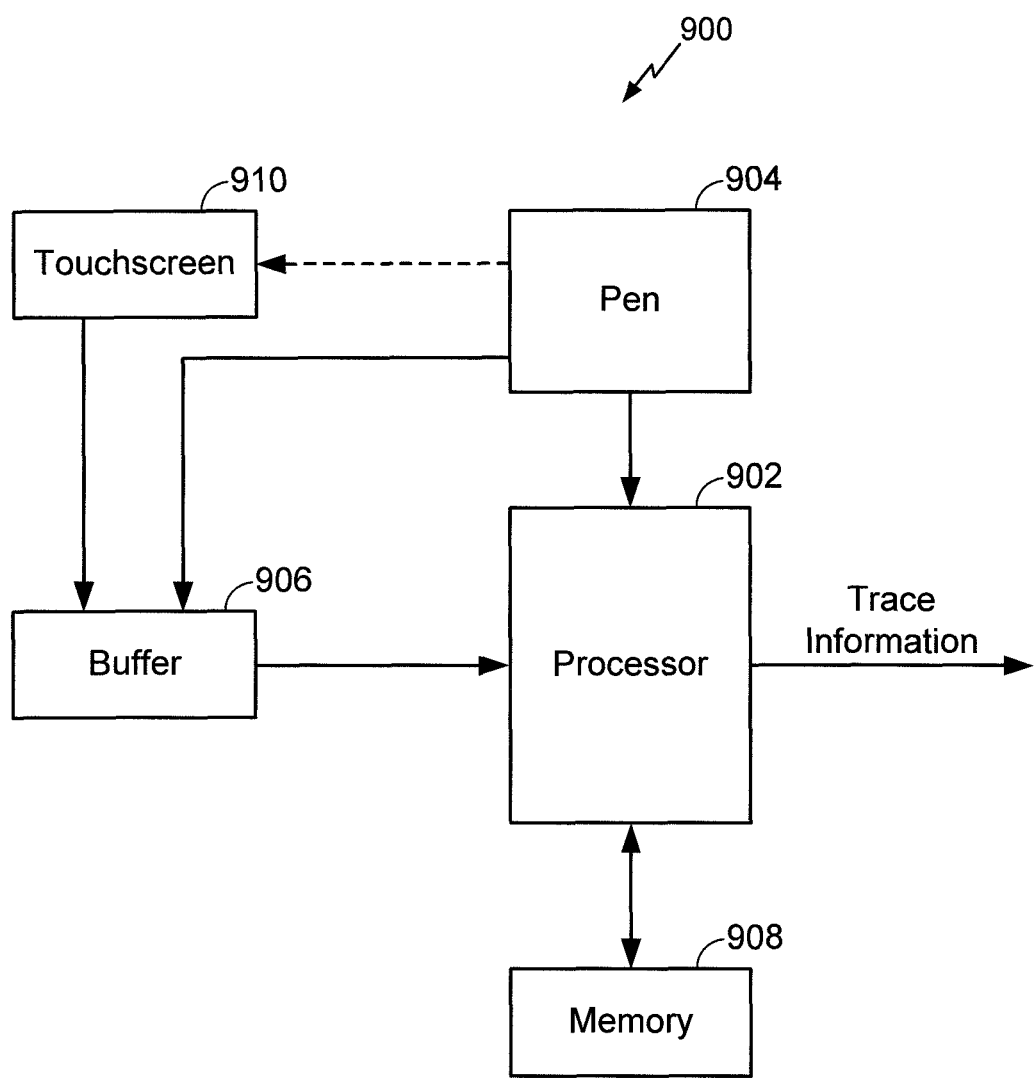
FIG. 9 illustrates a block diagram of an exemplary apparatus in accordance with various aspects disclosed herein.

FIG. 9 illustrates a block diagram of an exemplary system 900 in accordance with the various aspects disclosed herein. For example, system 900 can include elements such as a touchscreen 910, a buffer 906, a pen 904, a processor 902, and a memory 908. These elements may be in communication with each other as is known in the art and discussed herein (e.g., passive/active pens, etc.). Those of skill in the art will appreciate that the links shown in FIG. 9 may be wired or wireless links. Further, those of skill in the art will appreciate that the links shown may be direct, indirect, or logical links. For example, the pen 904 is not required to be in direct communication with the buffer 906 and/or the processor 902. In some embodiments, neither information nor data from the pen 904 is communicated to the buffer 906 via the processor 902 and/or one or more elements such as an input/output interface, microphone, wireless receiver, etc. Accordingly, the arrangement of FIG. 9 is merely provided for illustration and not limitation of the various aspects of the disclosure. Additionally, it will be appreciated that the various elements illustrated in FIG. 9 can be used to perform the various functionalities disclosed herein. For example, in one aspect, system 900 can be configured to reject palm touches on a touchscreen 910. The system 900 can include logic configured to determine (e.g., implemented in processor 902 in combination with memory 908) whether or not a pen 904 is touching the touchscreen 910, and a touch buffer (e.g., buffer 906) can be configured to buffer trace information generated by a user's touch if the pen is not touching the touchscreen 910. The system 900 can also include logic configured to clear the touch buffer 906 and buffer (e.g., also in buffer 906) trace information generated by the pen, if the pen 904 is touching the touchscreen 910. It will be appreciated that the logic configured to clear the touch buffer can also be implemented by processor 902 in combination with memory 908. However, aspects may also be implemented in independent application specific circuits as discussed herein and may be integrated into the various elements (e.g., pen 904, touchscreen 910, etc.). Further, while buffer 906 has been described as buffering both the touch and pen information, it will be appreciated that aspects may include two or more buffers that may be separate (e.g., may be integrated in the touchscreen 910 and pen 904), may be implemented by the processor 902 (which may be one or more processors) in combination with memory 908 (which may be integrated into processor 902 or one or more separate elements) or any combination of the foregoing. Also, it will be appreciated that system 900 may be any device that uses, integrates and/or incorporates the various elements disclosed herein, such as a wireless device, smart phone, personal computer, laptop, tablet, etc.

Further, the system 900 may include various elements of the architecture 100 illustrated in FIG. 1. For example, the processor 902 in combination with the memory 908 and buffer 906 may include the scratch mode configuration 112, the palm rejection configuration 114, the multi-layer buffer manager 118, the ultrasound pen service 122, and/or the touch sensor service 124. Alternatively, the elements of architecture 100 may be incorporated in other system components not shown in FIG. 9.

Figure 10:
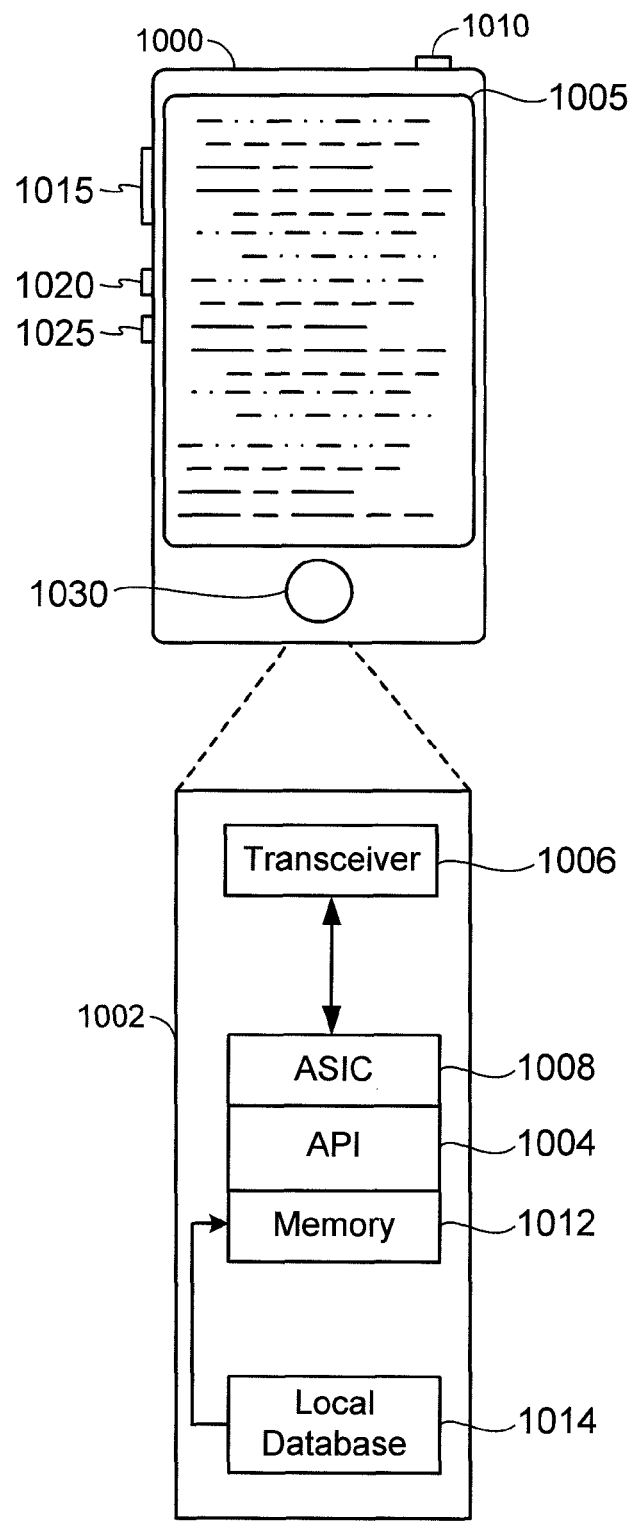
FIG. 10 illustrates an example of a user equipment (UE) in accordance with an aspect of the disclosure.

FIG. 10 illustrates an exemplary UE in accordance with an aspect of the disclosure. Referring to FIG. 10, UE 1000 is illustrated as a touchscreen device (e.g., a smart phone, a tablet computer, etc.). As shown in FIG. 10, an external casing of UE 1000 is configured with a touchscreen display 1005, peripheral buttons 1010, 1015, 1020, and 1025 (e.g., a power control button, a volume or vibrate control button, an airplane mode toggle button, etc.), at least one front-panel button 1030 (e.g., a Home button, etc.), among other components, as is known in the art. While not shown explicitly as part of UE 1000, the UE 1000 can include one or more external antennas and/or one or more integrated antennas that are built into the external casing of UE 1000, including but not limited to WiFi antennas, cellular antennas, satellite position system (SPS) antennas (e.g., global positioning system (GPS) antennas), and so on.

While internal components of UEs, such as the UE 1000, can be embodied with different hardware configurations, a basic high-level UE configuration for internal hardware components is shown as platform 1002 in FIG. 10. The platform 1002 can receive and execute software applications, data and/or commands transmitted from a wireless access point or a radio access network (RAN) that may ultimately come from a core network, the Internet, and/or other remote servers and networks (e.g., an application server, web URLs, etc.). The platform 1002 can also independently execute locally stored applications without RAN interaction. The platform 1002 can include a transceiver 1006 operably coupled to an application specific integrated circuit (ASIC) 1008, or other processor, microprocessor, logic circuit, or other data processing device. The ASIC 1008 or other processor executes the application programming interface (API) 1004 layer that interfaces with any resident programs in the memory 1012 of the wireless device. The memory 1012 can be comprised of read-only memory (ROM) or random-access memory (RAM), electrically erasable programmable ROM (EEPROM), flash cards, or any memory common to computer platforms. The platform 1002 also can include a local database 1014 that can store applications not actively used in memory 1012, as well as other data. The local database 1014 is typically a flash memory cell, but can be any secondary storage device as known in the art, such as magnetic media, EEPROM, optical media, tape, soft or hard disk, or the like.

Further, the platform 1002 may include various elements of the architecture 100 illustrated in FIG. 1. For example, the ASIC 1008 in combination with the API 1004, the memory 1012, and the local database 1014 may include the scratch mode configuration 112, the palm rejection configuration 114, the multi-layer buffer manager 118, the ultrasound pen service 122, and/or the touch sensor service 124. Alternatively, the elements of architecture 100 may be incorporated in other UE components not shown in FIG. 10. Further, the platform 1002 may omit one or more of the elements illustrated in FIG. 10. For example, the transceiver 1006 may be omitted in some embodiments. Further, one or more microphones configured to receive ultrasonic signals may be included in the platform 1002, as may one or more other elements which are not illustrated in FIG. 10.

Accordingly, an aspect of the disclosure can include a UE (e.g., LIE 1000, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 1008, memory 1012, API 1004 and local database 1014 may all be used cooperatively to load, store and execute the various functions disclosed herein and thus the logic to perform these functions may be distributed over various elements. Alternatively, the functionality could be incorporated into one discrete component. Therefore, the features of the UE 1000 in FIG. 10 are to be considered merely illustrative and the disclosure is not limited to the illustrated features or arrangement.

Figure 11:
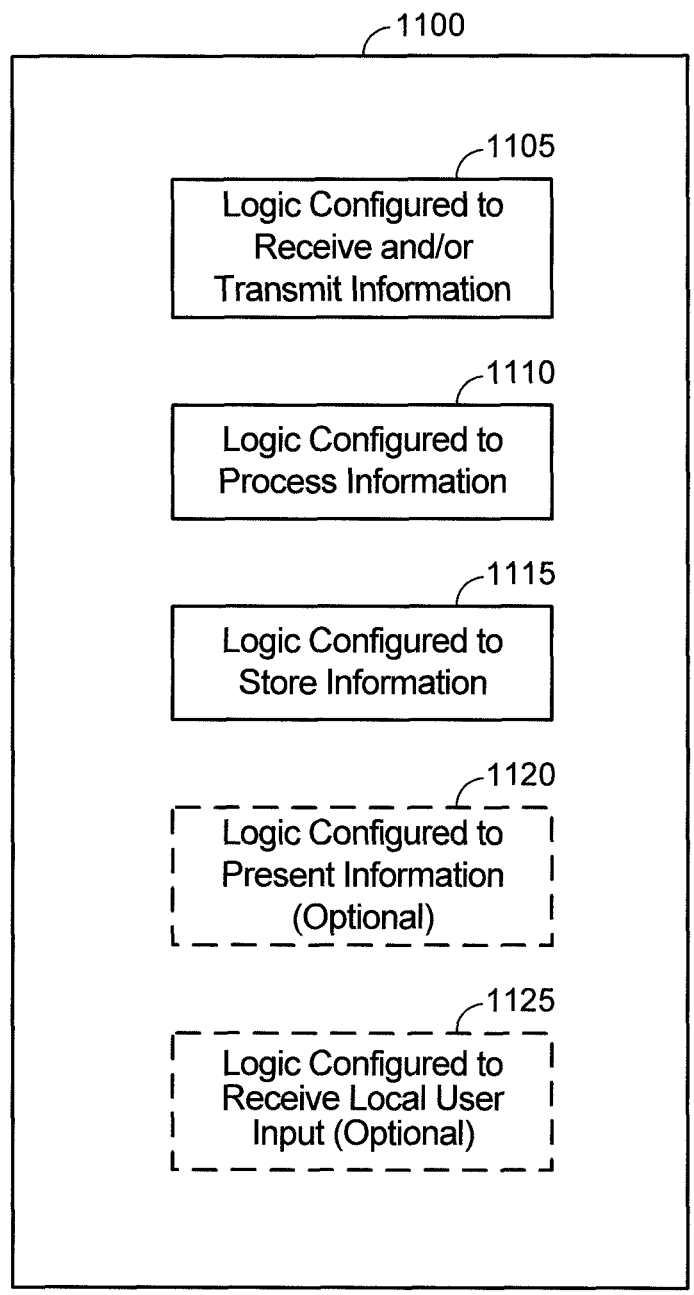
FIG. 11 illustrates a communication device that includes logic configured to perform functionality in accordance with an aspect of the disclosure.

FIG. 11 illustrates a communication device 1100 that includes logic configured to perform functionality. The communication device 1100 can correspond to any of the above-noted communication devices, including but not limited to UEs 806 and 1000.

Referring to FIG. 11, the communication device 1100 includes logic configured to receive and/or transmit information 1105. In an example, if the communication device 1100 corresponds to a wireless communications device (e.g., UE 1000), the logic configured to receive and/or transmit information 1105 can include a wireless communications interface (e.g., Bluetooth, WiFi, 2 G, CDMA, W-CDMA, 3 G, 4 G, LTE, etc.) such as a wireless transceiver and associated hardware (e.g., a radio frequency (RF) antenna, a MODEM, a modulator and/or demodulator, etc.). In another example, the logic configured to receive and/or transmit information 1105 can correspond to a wired communications interface (e.g., a serial connection, a USB or Firewire connection, an Ethernet connection through which the Internet can be accessed, etc.). In a further example, the logic configured to receive and/or transmit information 1105 can include sensory or measurement hardware by which the communication device 1100 can monitor its local environment (e.g., an accelerometer, a temperature sensor, a light sensor, an antenna for monitoring local RF signals, etc.). In another example, the logic configured to receive and/or transmit information 1105 can include one or more microphones and/or sensors to receive information from a pen, such as ultrasound pen 802 in FIG. 8. The logic configured to receive and/or transmit information 1105 may include the IPC/socket 128, the active stylus driver 132, and/or the touch sensor driver 134 of FIG. 1. The logic configured to receive and/or transmit information 1105 can also include software that, when executed, permits the associated hardware of the logic configured to receive and/or transmit information 1105 to perform its reception and/or transmission function(s). However, the logic configured to receive and/or transmit information 1105 does not correspond to software alone, and the logic configured to receive and/or transmit information 1105 relies at least in part upon hardware to achieve its functionality.

Referring to FIG. 11, the communication device 1100 further includes logic configured to process information 1110. In an example, the logic configured to process information 1110 can include at least a processor. Example implementations of the type of processing that can be performed by the logic configured to process information 1110 includes but is not limited to performing determinations, establishing connections, making selections between different information options, performing evaluations related to data, interacting with sensors coupled to the communication device 1100 to perform measurement operations, converting information from one format to another (e.g., between different protocols such as .wmv to .avi, etc.), and so on. The logic configured to process information 1110 may include the scratch mode configuration 112, the palm rejection configuration 114, the multi-layer buffer manager 118, the ultrasound pen service 122, and/or the touch sensor service 124 of FIG. 1, and/or the processor 902 of FIG. 9. The logic configured to process information 1110 can include logic configured to determine whether or not a pen is within a threshold distance of the touchscreen, logic configured to store trace information generated by a user's touch in a touch buffer if the pen is not within the threshold distance of the touchscreen, and logic configured to clear the touch buffer and store trace information generated by the pen in the touch buffer if the pen is within the threshold distance of the touchscreen. The processor included in the logic configured to process information 1110 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 1110 can also include software that, when executed, permits the associated hardware of the logic configured to process information 1110 to perform its processing function(s). However, the logic configured to process information 1110 does not correspond to software alone, and the logic configured to process information 1110 relies at least in part upon hardware to achieve its functionality.

Referring to FIG. 11, the communication device 1100 further includes logic configured to store information 1115. The logic configured to store information 1115 can include logic configured to store trace information generated by a user's touch in a touch buffer if the pen is not within the threshold distance of the touchscreen and logic configured to clear the touch buffer and store trace information generated by the pen in the touch buffer if the pen is within the threshold distance of the touchscreen. In an example, the logic configured to store information 1115 can include at least a non-transitory memory and associated hardware (e.g., a memory controller, etc.). For example, the non-transitory memory included in the logic configured to store information 1115 can correspond to RAM, flash memory, ROM, erasable programmable ROM (EPROM), EEPROM, registers, hard disk, a removable disk, a CD-ROM, or any other form of storage medium known in the art. The logic configured to store information can include the multi-layer buffer manager 118 of FIG. 1 and/or the buffer 906 and/or the memory 908 of FIG. 9. The logic configured to store information 1115 can also include software that, when executed, permits the associated hardware of the logic configured to store information 1115 to perform its storage function(s). However, the logic configured to store information 1115 does not correspond to software alone, and the logic configured to store information 1115 relies at least in part upon hardware to achieve its functionality.

Referring to FIG. 11, the communication device 1100 further optionally includes logic configured to present information 1120. In an example, the logic configured to present information 1120 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 1100. For example, if the communication device 1100 corresponds to UE 1000 as shown in FIG. 10, the logic configured to present information 1120 can include the touchscreen display 1005 of UE 1000. In a further example, the logic configured to present information 1120 can be omitted for certain communication devices, such as network communication devices that do not have a local user (e.g., network switches or routers, remote servers, etc.). The logic configured to present information 1120 can also include software that, when executed, permits the associated hardware of the logic configured to present information 1120 to perform its presentation function(s). However, the logic configured to present information 1120 does not correspond to software alone, and the logic configured to present information 1120 relies at least in part upon hardware to achieve its functionality.

Referring to FIG. 11, the communication device 1100 further optionally includes logic configured to receive local user input 1125. In an example, the logic configured to receive local user input 1125 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 1100. For example, if the communication device 1100 corresponds to UE 1000 as shown in FIG. 10, the logic configured to receive local user input 1125 can include any of the buttons 1010 through 1025, the touchscreen display 1005, etc. As another example, if the communication device 1100 corresponds to UE 806 as shown in FIG. 8, the logic configured to receive local user input 1125 can include any of the microphones 822, 824, and 826. In a further example, the logic configured to receive local user input 1125 can be omitted for certain communication devices, such as network communication devices that do not have a local user (e.g., network switches or routers, remote servers, etc.). The logic configured to receive local user input 1125 can also include software that, when executed, permits the associated hardware of the logic configured to receive local user input 1125 to perform its input reception function(s). However, the logic configured to receive local user input 1125 does not correspond to software alone, and the logic configured to receive local user input 1125 relies at least in part upon hardware to achieve its functionality.

Referring to FIG. 11, while the configured logics of 1105 through 1125 are shown as separate or distinct blocks in FIG. 11, it will be appreciated that the hardware and/or software by which the respective configured logic performs its functionality can overlap in part. For example, any software used to facilitate the functionality of the configured logics of 1105 through 1125 can be stored in the non-transitory memory associated with the logic configured to store information 1115, such that the configured logics of 1105 through 1125 each performs their functionality (i.e., in this ease, software execution) based in part upon the operation of software stored by the logic configured to store information 1115. Likewise, hardware that is directly associated with one of the configured logics can be borrowed or used by other configured logics from time to time. For example, the processor of the logic configured to process information 1110 can format data into an appropriate format before being transmitted by the logic configured to receive and/or transmit information 1105, such that the logic configured to receive and/or transmit information 1105 performs its functionality (i.e., in this case, transmission of data) based in part upon the operation of hardware (i.e., the processor) associated with the logic configured to process information 1110.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is property termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed, in the singular, the plural is contemplated unless limitation to the singular is explicitly stated.

What is claimed is:

1. A method for storing trace information, comprising:
   determining whether or not a pen is within a threshold distance of a touchscreen;
   storing trace information generated by a user's touch in a touch buffer in response to determining that the pen is not within the threshold distance of the touchscreen;
   clearing the touch buffer and storing trace information generated by the pen in the touch buffer in response to determining that the pen is within the threshold distance of the touchscreen;
   determining that the touchscreen is in a multi-layer scratch paper mode;
   displaying a scratch paper layer over a background layer; and
   increasing a transparency of the background layer.

2. The method of claim 1, wherein the threshold distance is zero.

3. The method of claim 1, further comprising:
   displaying, on the touchscreen, the trace information generated by the pen; and
   displaying, on the touchscreen, the trace information generated by the user's touch.

4. The method of claim 1, further comprising:
   if the pen is touching the touchscreen, disabling trace information generated by the user's touch.

5. The method of claim 1, further comprising:
   if the pen is not touching the touchscreen, determining whether or not the user's touch is a finger touch or a palm touch.

6. The method of claim 5, wherein the determining whether or not the user's touch is a finger touch or a palm touch comprises:
   determining whether or not a size of the user's touch is greater than a threshold;
   if the size is not greater than the threshold, determining that the user's touch is a finger touch;
   if the size is greater than the threshold, determining whether or not the user's touch is moving;

if the user's touch is moving, determining that the user's touch is a finger touch; and if the user's touch is not moving, determining that the user's touch is a palm touch.

7. The method of claim 1, further comprising:

if the pen is not touching the touchscreen, permitting multi-touch events.

8. The method of claim 1, wherein the determining, storing, and clearing are performed on a native operating system layer that is transparent to a pen application.

9. The method of claim 1, further comprising:

storing the scratch paper layer and the background layer in the touch buffer.

10. The method of claim 1, wherein the increasing permits both the background layer and the scratch paper layer to be visible to a user.

11. The method of claim 1, further comprising:

determining that the touchscreen is not in the multi-layer scratch paper mode; and moving the scratch paper layer behind the background layer.

12. The method of claim 11, further comprising:

determining whether or not the scratch paper layer should be deleted;

if the scratch paper layer should be deleted, removing the scratch paper layer from the touch buffer and decrementing a layer counter; and if the scratch paper layer should not be deleted, storing the scratch paper layer in the touch buffer and incrementing the layer counter.

13. The method of claim 1, further comprising:

determining that the pen is not touching the touchscreen;

calculating a vertical distance between the pen and the touchscreen; and changing a trace of the pen based on the vertical distance.

14. The method of claim 13, wherein the changing the trace comprises changing a color of the trace or a width of the trace.

15. The method of claim 13, further comprising:

calculating a tilt of the pen; and changing the trace of the pen based on the tilt.

16. The method of claim 15, wherein changing the trace of the pen based on the tilt comprises changing a width of the trace.

17. The method of claim 14, further comprising:

determining that the touchscreen is in a pressure sense mode; and overriding a tip-up timer of the pen.

18. The method of claim 1, wherein the pen is an ultrasound pen.

19. An apparatus for storing trace information, comprising:

logic configured to determine whether or not a pen is within a threshold distance of a touchscreen;

logic configured to store trace information generated by a user's touch in a touch buffer in response to determining that the pen is not within the threshold distance of the touchscreen;

logic configured to clear the touch buffer and store trace information generated by the pen in the touch buffer in response to determining that the pen is within the threshold distance of the touchscreen;

logic configured to determine that the touchscreen is in a multi-layer scratch paper mode;

logic configured to display a scratch paper layer over a background layer; and logic configured to increase a transparency of the background layer.

20. The apparatus of claim 19, wherein the threshold distance is zero.

21. The apparatus of claim 19, further comprising:

logic configured to display, on the touchscreen, the trace information generated by the pen; and logic configured to display, on the touchscreen, the trace information generated by the user's touch.

22. The apparatus of claim 19, further comprising:

logic configured to disable trace information generated by the user's touch if the pen is touching the touchscreen.

23. The apparatus of claim 19, further comprising:

logic configured to determine whether or not the user's touch is a finger touch or a palm touch if the pen is not touching the touchscreen.

24. The apparatus of claim 23, wherein the logic configured to determine whether or not the user's touch is a finger touch or a palm touch comprises:

logic configured to determine whether or not a size of the user's touch is greater than a threshold;

logic configured to determine that the user's touch is a finger touch if the size is not greater than the threshold;

logic configured to determine whether or not the user's touch is moving if the size is greater than the threshold;

logic configured to determine that the user's touch is a finger touch if the user's touch is moving; and logic configured to determine that the user's touch is a palm touch if the user's touch is not moving.

25. The apparatus of claim 19, further comprising:

logic configured to permit multi-touch events if the pen is not touching the touchscreen.

26. The apparatus of claim 19, wherein a native operating system layer that is transparent to a pen application includes the logic configured to determine, the logic configured to store, and the logic configured to clear.

27. The apparatus of claim 19, further comprising:

logic configured to store the scratch paper layer and the background layer in the touch buffer.

28. The apparatus of claim 19, wherein the logic configured to increase permits both the background layer and the scratch paper layer to be visible to a user.

29. The apparatus of claim 19, further comprising:

logic configured to determine that the touchscreen is not in the multi-layer scratch paper mode; and logic configured to move the scratch paper layer behind the background layer.

30. The apparatus of claim 29, further comprising:

logic configured to determine whether or not the scratch paper layer should be deleted;

logic configured to remove the scratch paper layer from the touch buffer and decrement a layer counter if the scratch paper layer should be deleted; and logic configured to store the scratch paper layer in the touch buffer and increment the layer counter if the scratch paper layer should not be deleted.

31. The apparatus of claim 19, further comprising:

logic configured to determine that the pen is not touching the touchscreen;

logic configured to calculate a vertical distance between the pen and the touchscreen; and logic configured to change a trace of the pen based on the vertical distance.

32. The apparatus of claim 31, wherein the logic configured to change the trace comprises logic configured to change a color of the trace or a width of the trace.

33. The apparatus of claim 31, further comprising:
  logic configured to calculate a tilt of the pen; and
  logic configured to change the trace of the pen based on the tilt.

34. The apparatus of claim 33, wherein the logic configured to change the trace of the pen based on the tilt comprises logic configured to change a width of the trace.

35. The apparatus of claim 31, further comprising:
  logic configured to determine that the touchscreen is in a pressure sense mode; and
  logic configured to override a tip-up timer of the pen.

36. The apparatus of claim 19, wherein the pen is an ultrasound pen.

37. An apparatus for storing trace information, comprising:
  means for determining whether or not a pen is within a threshold distance of a touchscreen;
  means for storing trace information generated by a user's touch in a touch buffer in response to determining that the pen is not within the threshold distance of the touchscreen;
  means for clearing the touch buffer and storing trace information generated by the pen in the touch buffer in response to determining that the pen is within the threshold distance of the touchscreen;
  means for determining that the touchscreen is in a multi-layer scratch paper mode;
  means for displaying a scratch paper layer over a background layer; and
  means for increasing a transparency of the background layer.

38. A non-transitory computer-readable medium for storing trace information, comprising:
  at least one instruction to determine whether or not a pen is within a threshold distance of a touchscreen;
  at least one instruction to store trace information generated by a user's touch in a touch buffer in response to determining that the pen is not within the threshold distance of the touchscreen;
  at least one instruction to clear the touch buffer and store trace information generated by the pen in the touch buffer in response to determining that the pen is within the threshold distance of the touchscreen;
  at least one instruction to determine that the touchscreen is in a multi-layer scratch paper mode;
  at least one instruction to display a scratch paper layer over a background layer; and
  at least one instruction to increase a transparency of the background layer.

* * * * *